United States Patent
Phillips et al.

(10) Patent No.: US 6,366,744 B1
(45) Date of Patent: Apr. 2, 2002

(54) IMAGE FORMING SYSTEMS AND METHODS FOR DETERMINING WHETHER AN IMAGE JOB WILL BE IMAGED

(75) Inventors: Quintin T. Phillips, Boise; Darius Boockholdt, Eagle; Mark A. Harper, Middleton; Robert E. Haines; Mary B Baumunk, both of Boise, all of ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/602,640

(22) Filed: Jun. 22, 2000

(51) Int. Cl.[7] ........................ G03G 15/00; G03G 15/08
(52) U.S. Cl. .......................................... 399/24; 399/29
(58) Field of Search ........................ 399/8, 24, 27, 399/29, 30, 49

(56) References Cited

U.S. PATENT DOCUMENTS

| | | | |
|---|---|---|---|
| 4,535,463 A | 8/1985 | Ito et al. ........................ 377/8 |
| 4,734,747 A | 3/1988 | Okuda et al. ........... 355/14 SH |
| 4,748,479 A | 5/1988 | Ohira et al. ................... 355/72 |
| 4,963,927 A | * 10/1990 | Ishihara ....................... 399/29 |
| 5,021,826 A | 6/1991 | Maruta ....................... 355/205 |
| 5,036,361 A | 7/1991 | Filion et al. ................. 355/209 |
| 5,096,180 A | 3/1992 | Nagaoka et al. ............ 271/110 |
| 5,202,769 A | 4/1993 | Suzuki ........................ 358/300 |
| 5,204,698 A | 4/1993 | LeSueur et al. ............ 346/160 |
| 5,537,550 A | 7/1996 | Russell et al. ........ 395/200.11 |
| 5,592,298 A | 1/1997 | Caruso ........................ 358/298 |
| 5,611,046 A | 3/1997 | Russell et al. ........... 395/200.1 |
| 5,636,032 A | 6/1997 | Springett ..................... 358/296 |
| 5,797,061 A | 8/1998 | Overall et al. ................ 399/27 |
| 5,802,420 A | 9/1998 | Garr et al. ..................... 399/27 |
| 5,930,553 A | * 7/1999 | Hirst et al. ............... 399/24 X |
| 5,937,225 A | 8/1999 | Samuels ....................... 399/27 |
| 6,028,674 A | * 2/2000 | Tognazzini ............... 399/49 X |
| 6,108,492 A | * 8/2000 | Miyachi .................... 399/8 X |

* cited by examiner

Primary Examiner—Fred L. Braun

(57) ABSTRACT

Image forming systems and methods of forming an image are described. According to one exemplary aspect of the invention, a system includes a consumable monitoring device which provides a current amount of a consumable, such as toner. The system of this aspect also includes a memory device configured to store historical information regarding the consumable. A processor provides a requirement amount of the consumable and statistically modifies at least one of the requirement amount and the current amount using the historical information. Exemplary statistical modification uses a ratio of an estimation of a number of pixels within previous image jobs and the actual number of pixels imaged within previous jobs. Thereafter, the processor analyzes the requirement amount with respect to the current amount to determine the probability that an image job will be successfully imaged. In one arrangement, a confidence value is utilized for statistical modification. In addition, the historical information may be weighted. Additional aspects of the invention are also disclosed.

20 Claims, 6 Drawing Sheets

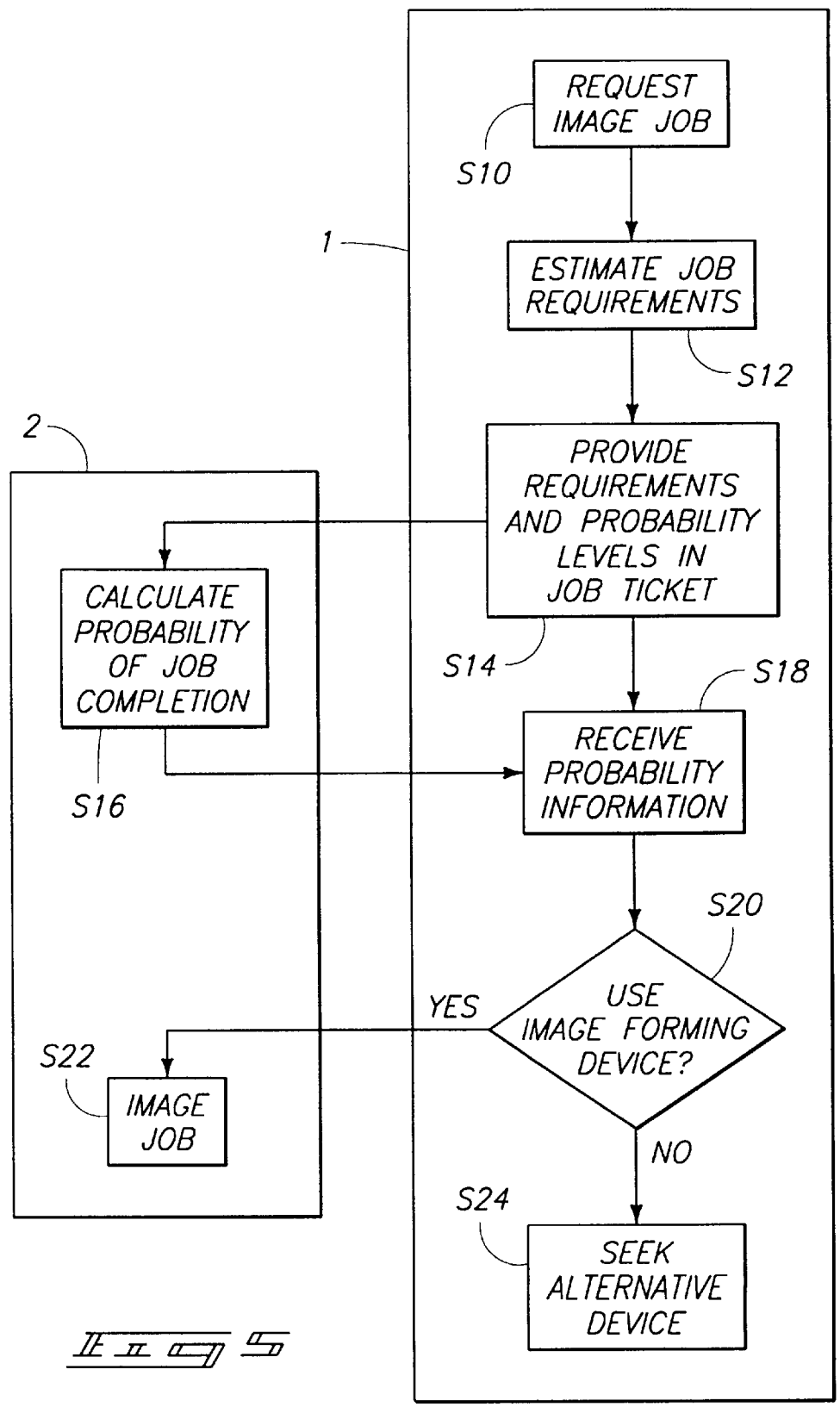

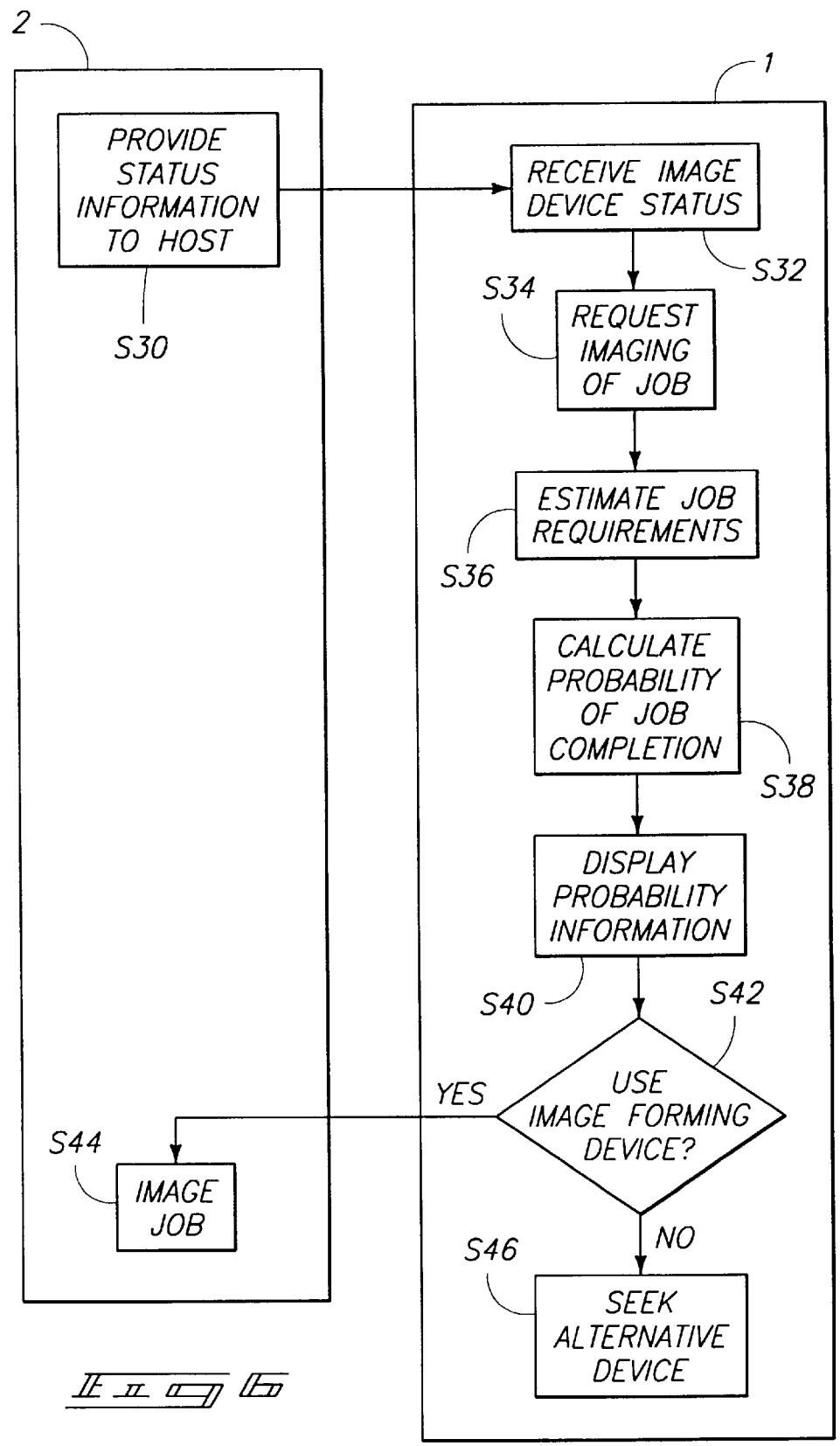

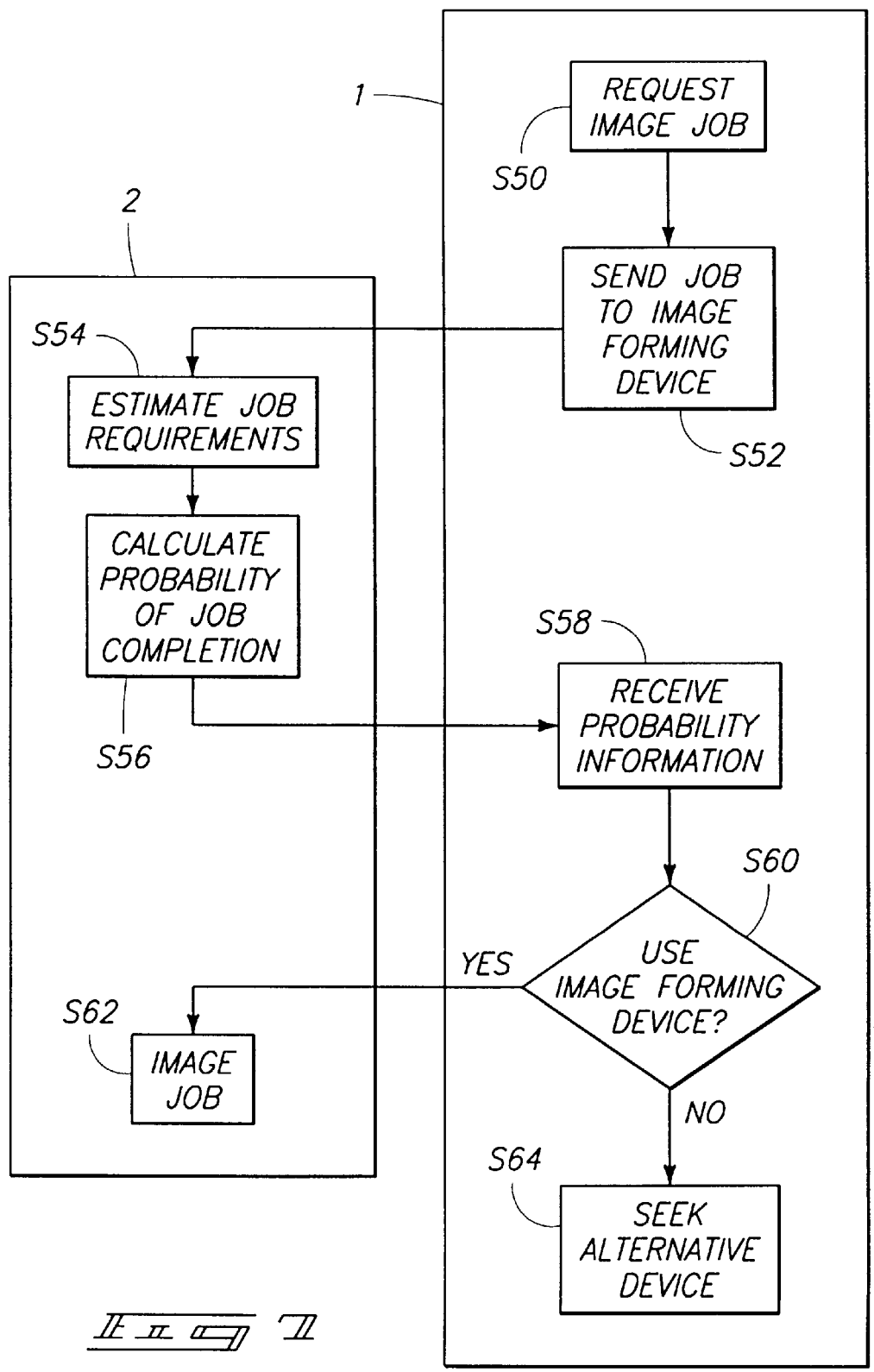

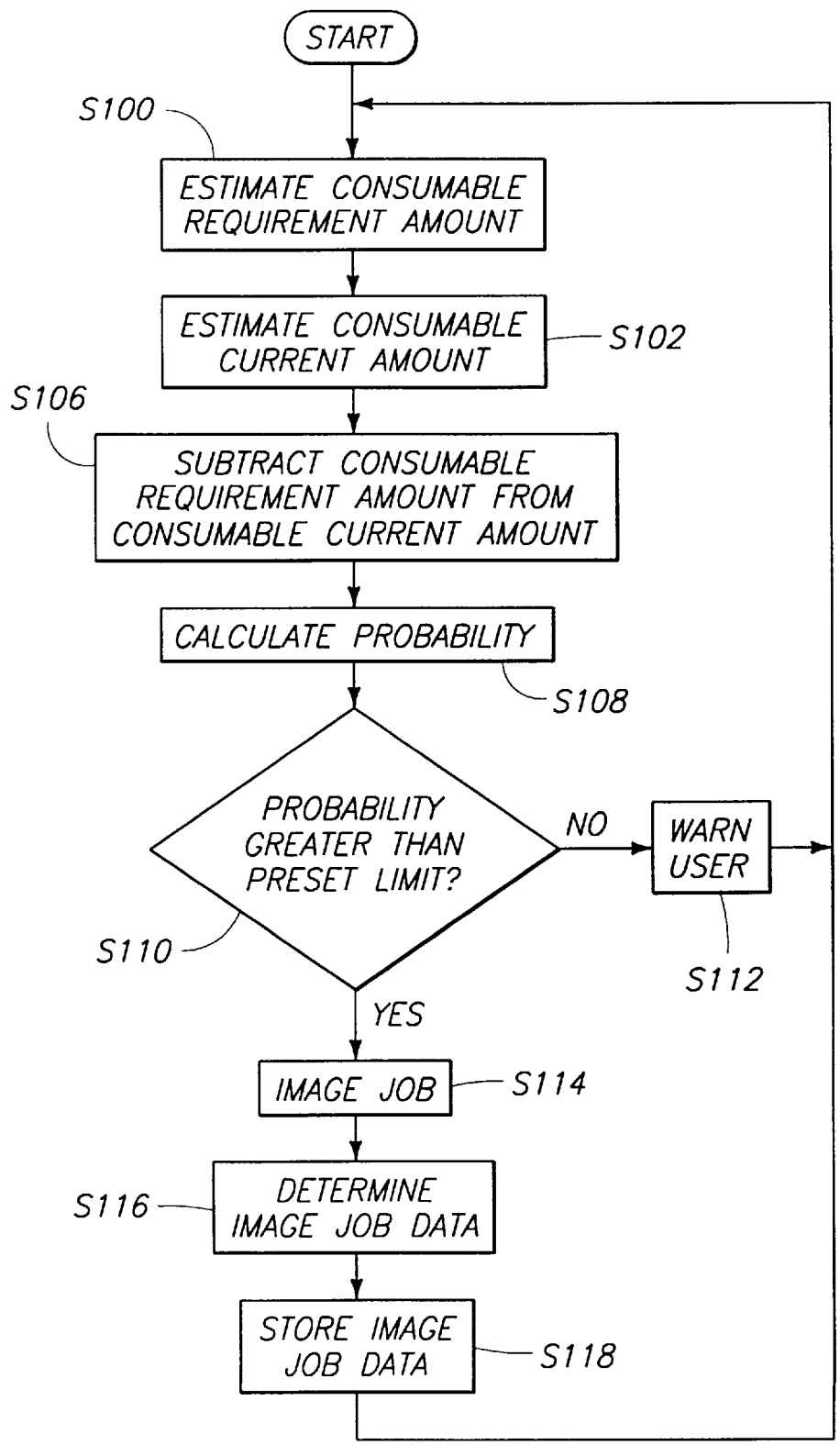

IMAGE FORMING SYSTEMS AND METHODS FOR DETERMINING WHETHER AN IMAGE JOB WILL BE IMAGED

FIELD OF THE INVENTION

The invention relates to image forming systems and methods of forming an image.

BACKGROUND OF THE INVENTION

Document preparation has become increasingly sophisticated in recent years. Conventional image forming devices, such as laser printers, ink jet printers, facsimile devices, etc., have continued to evolve to provide advances including increased throughput, improved imaging, and increased efficiencies.

Conventional printer configurations are typically coupled with a host computer system, or alternatively, with numerous host computer systems via a network. The host computer system(s) is configured to interface with the appropriate printer. The host computer system may be arranged to download a print job to the printer via an associated connection. Some conventional printers are configured to parse the incoming data, to rasterize the data, and to print an image corresponding to the data.

Such conventional arrangements provide a driver, such as a page description language (PDL) driver, within the host computer system. Exemplary page description languages include PCL and Postscript. The associated printer includes a parser which is configured to operate in conjunction with the appropriate page description language driver of the host computer system. The attached printer may have plural page description language parsers for use with multiple drivers.

Following processing within the appropriate page description language parser, the received data is rasterized and applied to the print engine of the printer. Thereafter, imaging of the data upon media is usually performed.

In typical conventional configurations, a printer is coupled with numerous host systems to provide printing functions for such host systems. The host systems may be coupled with a remotely located printer via a network. Such printers are subject to numerous print jobs from numerous hosts. During extensive printing, consumables, such as toner, media, etc. may be exhausted without notification to one or more host. Numerous print jobs are subsequently held without printing if any one such consumable becomes expended. Frustration and lost time often results if a believed already printed job is in fact spooled and not printed.

Therefore, there exists a need to provide improved image forming devices and improved methods.

SUMMARY OF THE INVENTION

The invention provides image forming systems and methods of forming an image. According to one aspect, an image forming system comprises: an image engine configured to use a consumable to produce an image; a consumable monitoring device configured to provide a current amount of the consumable; a memory device configured to store historical information regarding the consumable; and a processor configured to provide a requirement amount of the consumable for an image job to be imaged, to statistically modify at least one of the requirement amount and the current amount using the historical information, and to analyze the requirement amount with respect to the current amount after the modification to determine the probability that the image job will be successfully imaged.

Another aspect provides a method of forming an image comprising: providing a current amount of a consumable; storing historical information regarding the consumable; providing a requirement amount of the consumable to produce an image job to be imaged; modifying at least one of the current amount and the requirement amount using the historical information; analyzing the requirement amount of the consumable with respect to the current amount of the consumable after the modifying; and forming the image corresponding to the image job using the consumable after the analyzing.

Another aspect provides an image forming system comprising: a print engine configured to print an image using toner; a consumable monitoring device configured to provide a current amount of the toner; a memory device configured to store historical information regarding usage of the consumable to print previous print jobs; and a processor configured to provide a requirement amount of the toner for a print job to be imaged, to statistically modify at the requirement amount of the toner and the current amount of the toner using the historical information, and to analyze the requirement amount with respect to the current amount after the modification to determine the probability that the image job will be successfully imaged, wherein the processor is configured to statistically modify the requirement amount using historical information comprising a ratio of estimations of the number of pixels within previous image jobs and the actual number of pixels within the previous image jobs.

Other features and advantages of the invention will become apparent to those of ordinary skill in the art upon review of the following detailed description, claims, and drawings.

DESCRIPTION OF THE DRAWINGS

Preferred embodiments of the invention are described below with reference to the following accompanying drawings.

FIG. 5 is a flowchart illustrating an exemplary method for implementing imaging operations within the image forming system.

FIG. 6 is a flowchart of another exemplary method for implementing imaging operations.

FIG. 7 is a flowchart illustrating yet another exemplary method for implementing imaging operations.

FIG. 8 is a flowchart illustrating an exemplary method to determine the probability that a job will be imaged.

DETAILED DESCRIPTION OF THE INVENTION

Figure 1:
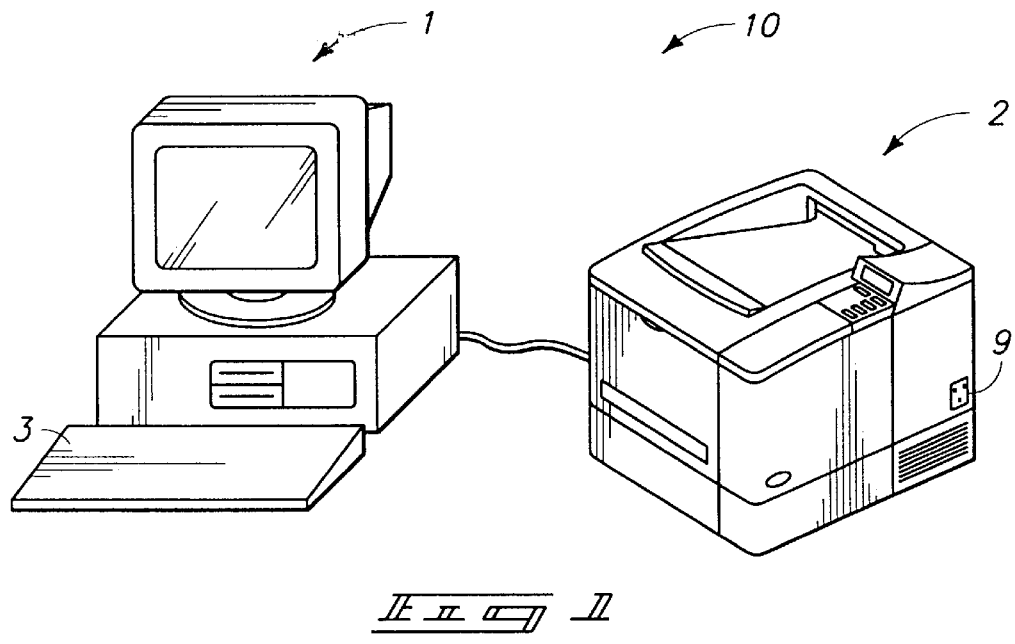
FIG. 1 is an illustrative representation of an exemplary image forming system.

Referring to FIG. 1, an exemplary image forming system 10 is shown. The present invention is described generally with reference to a printer application for printing images. The present invention is implemented within other image forming systems in other embodiments.

The depicted image forming system 10 includes a host device 1 and an image forming device 2. Host device 1 and image forming device 2 are coupled via a connection in the described embodiment. The illustrated image forming device 2 includes an input 9 configured to connect with an external power source, such as a local utility.

Host device 1 is configured as a personal computer (PC) in the depicted arrangement. The described host device 1 includes a processor, such as a Pentium (TM) processor, available from Intel Corporation. Other configurations of host device 1 are provided in other embodiments.

The depicted image forming device 2 comprises a printer, such as a laser printer or an ink jet printer. The present invention is not limited to the disclosed printer arrangement but is also applicable to other image forming devices. Exemplary alternative image forming devices 2 include facsimile devices, copiers, Mopiers (TM), other multiple function peripheral devices, etc.

Host device 1 of the depicted arrangement includes a user interface 3 comprising a keyboard. A user of image forming system 10 inputs original data, edit data and commands via user interface 3. Exemplary data includes word processor data. The data may be retrieved from memory within host device 1, retrieved from a network (not shown), created or entered by the user, etc.

Figure 2:
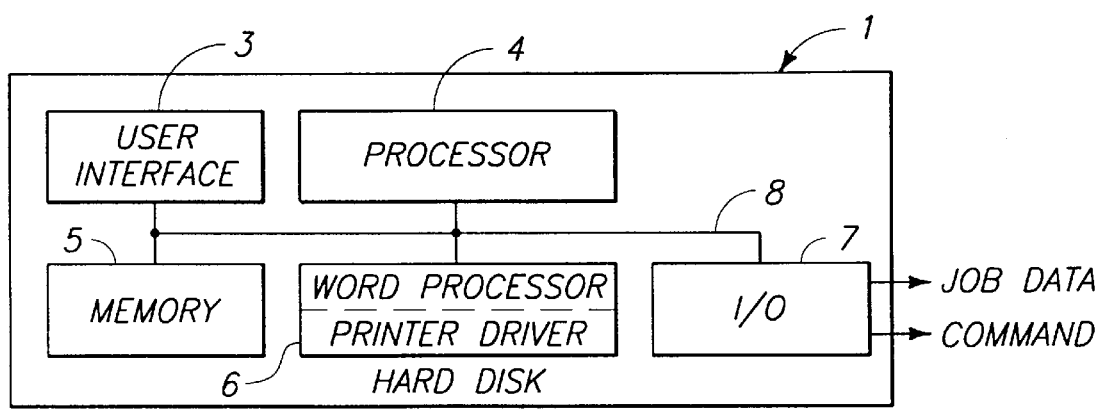
FIG. 2 is a functional block diagram of an exemplary host device of the image forming system.

Referring to FIG. 2, some components of the host device 1 are illustrated in functional form. The depicted host device 1 includes a user interface 3, a processor 4, a memory 5, a hard disk 6, an input/ output (I/O) port 7, and a bus 8. Bus 8 operates to interconnect components 3–7.

Processor 4 is configured to control operations of host device 1 responsive to executable instructions. For example, hard disk 6 stores initial boot instructions, word processor application instructions, and printer driver instructions for execution by processor 4. Hard disk 6 is also configured to store documents comprising original data. Responsive to appropriate key strokes via user interface 3, processor 4 executes an application, such as the word processor, to provide desired image creation and editing.

Appropriate portions of an executed application may be temporarily stored within memory 5 which includes read access memory (RAM) and read only memory (ROM) in the described configuration. During execution of the appropriate word processing application, a user may input commands via user interface 3. Such commands can be implemented to initiate the formation of images within image forming device 2 as described below.

Figures 3, 4:
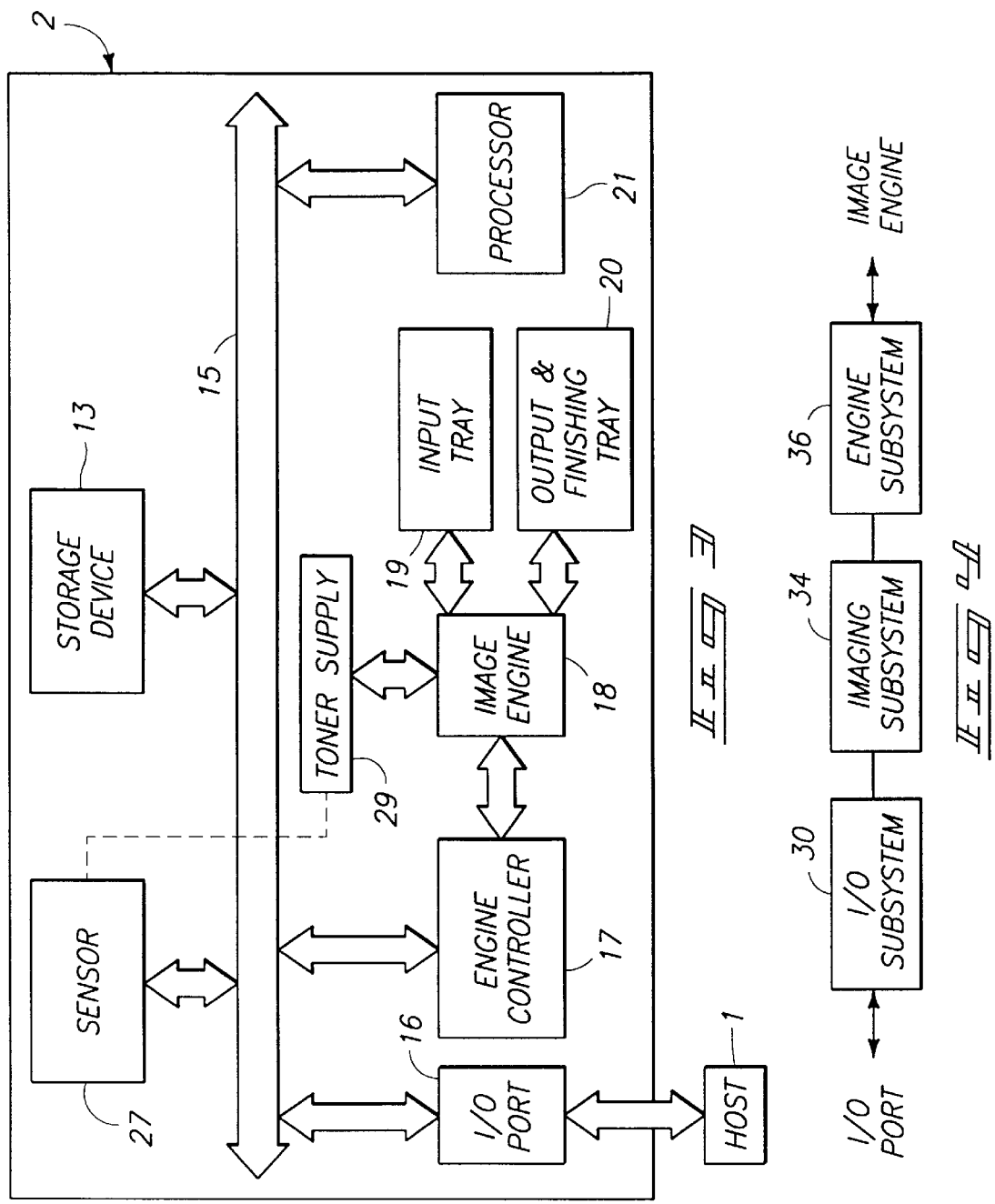
FIG. 3 is a functional block diagram of an exemplary image forming device of the image forming system.
FIG. 4 is a functional block diagram of exemplary firmware of the image forming device.

Referring to FIG. 3, the depicted embodiment of image forming device 2 comprises at least one storage device 13 including a hard disk storage device, a single-in-line-memory module (SIMM) device, a random access memory (RAM) device, and/or a read only memory (ROM) device. Individual storage devices 13 are coupled with a bus 15. The depicted image forming device 2 additionally comprises an input/output (I/O) port 16, an engine controller 17 and a processor 21. Other configurations of image forming device 2 are possible.

Processor 21 is configured to implement image processor, formatter or raster image processor (RIP) operations, and image engine controller 17 comprises a print engine control computer in exemplary embodiments. An exemplary processor 21 is available from Advanced Micro Devices, Inc. under a product designation 29040. Processor 21 communicates with other hardware elements of image forming device 2 via bus 15.

I/O port 16 comprises an input/output device adapted to couple with host device 1. I/O port 16 comprises an interface which provides communications between image forming device 2 and host device 1 in the described arrangement. I/O port 16 receives page description language data from host device 1 for processing Within image forming device 2 in accordance with the described embodiment. More specifically, data to be imaged is applied from host device 1 to image forming device 2 via I/O port 16.

Image engine controller 17 and associated image engine 18 provide image output capability for image forming device 2. Image engine 18 is connected directly to bus 15 in other arrangements. An exemplary image engine controller 17 may be implemented as microcontroller, such as an H8 controller available from Hitachi, Ltd. Image engine 18 is configured to form an image corresponding to the received data. In the described printer embodiment, image engine 18 is a print engine configured to print images corresponding to the received data upon media. An exemplary image engine 18 includes a developer assembly, etc.

Image engine 18 utilizes consumables to produce the images. For example, in the depicted configuration, image engine 18 is coupled with a toner supply 29 to form images upon sheet media. An exemplary toner supply 29 comprises a conventional cartridge arrangement. A consumable monitoring device is provided to monitor appropriate consumable levels. In the described configuration, consumable monitoring device comprises a sensor 27 in one configuration. For example, if toner is being monitored, sensor 27 monitors and provides information regarding a remaining or current amount of toner within toner supply 29 corresponding to discrete predefined levels.

Processor 21 is configured to monitor sensor 27 in the described embodiment. More specifically, processor 21 accesses consumable level information from sensor 27. Such information is stored as historical information regarding the consumable levels in storage device 13. Processor 21 also stores historical information regarding number of jobs imaged to date, number of pixels imaged, etc. within storage device 13.

Another consumable comprising sheet media is pulled from input ray 19 into image engine 18 and subsequently directed to output and finishing ray 20 in the described configuration. Output and finishing tray 20 includes, in an exemplary embodiment, finishing feature mechanisms such as sheet registration, binding, stapling, punching, and the like, and may include one or more bins for collation or "mailbox" usage purposes. Input tray 19 may also include a plurality of input trays for varied media selection.

According to the described embodiment, image engine 18 is a multi-resolution capable engine. For example, it can print, selectively, at 600 or 1200 dots per inch (dpi). For purposes of this disclosure, image engine 18 is a laser arrangement that employs an electrophotographic drum imaging system. Other image forming systems are utilized in other configurations.

Storage device 13 additionally provides main memory storage capabilities within image forming device 2 for storing image job data streams received from host device 1. Further, storage device 13 is utilized to store processed data within image forming device 2. Storage device 13 may be referred to herein as mass storage memory. Storage device 13 is further configured to store firmware which defines the operation of processor 21 and controls image forming device 2. Exemplary firmware code stored in the storage device includes an input/output (I/O) subsystem, an imaging subsystem, and an engine subsystem.

Referring to FIG. 4, exemplary firmware subsystems of image forming device 2 are illustrated. The firmware of the exemplary image forming device 2 provides an I/O subsystem 30, an imaging subsystem 34, and an engine subsystem 36.

I/O subsystem 30 is operable to accept inbound data received from I/O port 16 and prepare outbound data for communication via I/O port 16. I/O subsystem 30 is configured to strip I/O specific data from received data and pass the remaining data (e.g., page description language) to imaging subsystem 34.

In general, the operation of image forming device 2 commences responsive to the reception of page description data from host device 1 via I/O port 16 in the form of an image job data stream. The page description data is initially placed in storage device 13. Processor 21 accesses the page description language and performs initial operations, if any.

Thereafter, processor 21 builds a display command list using imaging subsystem 34. Imaging subsystem 34 contains a parser and rasterizer (not shown) configured to respectively parse and rasterize a data stream.

In particular, imaging subsystem 34 is configured in the described arrangement to process received data to convert page description language data received from host device 1 to a display command list. Individual display commands define an object to be printed on a page. Rasterizer firmware of imaging subsystem 34 is configured to convert individual display commands to an appropriate bit map (rasterized strip) and distribute the bit map into storage device 13. Compression firmware is provided in some configurations to compress the rasterized strips.

The rasterized data is retrieved from storage device 13 by engine subsystem 36. Engine subsystem 36 interfaces with image engine controller 17 and image engine 18 to provide the rasterized data upon the media. Rasterized strips of data are passed to image engine 18 by image engine controller 17 thereby enabling the generation of an image (i.e., text, graphics, etc.) when a page is closed for processing (i.e., all strips have been evaluated, rasterized, compressed, etc.). Engine subsystem 36 controls the sequencing and transferring of page strips to image engine controller 17.

While an image job is being prepared for printing, processor 21 instructs engine controller 17 to prepare image engine 18 for printing. For example, engine controller 17 turns on laser scanners of a development assembly, heaters of a fuser assembly, and various motors of image engine 18 (the specific assemblies and motors are not shown). When appropriate, engine controller 17 indicates to processor 21 that it is ready for reception of image data. Thereafter, processor 21 applies raster image data to engine controller 17. The image data typically comprises pulse width modulated signals for gray scale printing, or binary data for pixel printing, for example. Image engine 18 subsequently images the data upon media from input tray 19 and outputs imaged media to output tray 20.

According to aspects of the present invention, image forming system 10 is configured to attempt to warn a user if there is a sufficiently high probability that a job will not be imaged. For example, the image forming system 10 is configured to analyze current levels (i.e., a current amount) of a consumable versus an estimated consumable requirement amount to complete the job. Thereafter, image forming system 10 alerts a user if there is a high probability that an insufficient amount of a consumable exists to complete the job to be imaged. The user may thereafter remedy the insufficient consumable condition, select another image forming device, etc.

In one embodiment, processor 21 is configured to estimate the current amount and the requirement amount of the consumable and provide the results to the user. Alternatively, processor 4 within host device 1 provides the analysis of the current amount and the requirement amount and selectively warns the user.

In the described embodiment, the appropriate processor(s) of host device 1 and/or image forming device 2 determines the requirement amount of a consumable for an image job to be imaged. The appropriate processor is configured to statistically modify at least one of the requirement amount and the current amount of the consumable using historical information regarding the consumable. After the statistical modification, the processor analyzes the requirement amount with respect to the current amount to determine the probability that the image job will be successfully imaged. The processor compares the requirement amount with the current amount by subtraction in one embodiment. Further details of such statistical modification and comparison are described below in detail.

Referring to FIG. 5–FIG. 7, exemplary interfacing of host device 1 and image forming device 2 are shown. In the described embodiment, processor 4 is configured to perform the indicated steps within host device 1 while processor 21 is configured to execute the indicated steps within image forming device 2. The depicted respective methods are implemented as executable code stored within memory 5 and storage device 13 of host device 1 and image forming device 2, respectively. The depicted methods are implemented in hardware in other arrangements.

Referring initially to FIG. 5, the depicted method begins within image forming device 2 at step S10 wherein an image job is requested by the user or other source. In one arrangement, processor 4 of host device 1 idles at step S10 until an appropriate request is received.

Thereafter, processor 4 proceeds to step S12 to estimate the job requirements for the associated image job. For example, processor 4 determines image job complexity including for example determining the toner/ink required, pages required, memory resources required, etc. Such may be implemented by estimating the number of pixels to complete the current job. Such pixel estimation yields the consumable current amount. Exemplary methods of pixel estimation are described in U.S. Pat. Nos. 5,204,698 and 5,202,769, both of which are incorporated herein by reference.

Next, processor 4 proceeds to step S14 to provide determined job requirements (e.g., pixel count) and probability levels (e.g., confidence level or value described below) in a job ticket. The job ticket is forwarded to image forming device 2.

At step S16, image forming device 2 receives the job ticket including the job data to be imaged, the determined job requirements and the probability levels, for example. Processor 21 is configured to calculate the probability of job completion at step S16. In the described embodiment, processor 21 analyzes consumable status information and historical data information, and compares the consumable current amount to the consumable requirement amount. Processor 21 additionally subtracts resources dedicated to committed image jobs already in the queue when accounting for the consumable current amount. The exemplary consumable status includes toner/ink levels, process cartridge levels, fuser life, media levels, etc. Historical data includes toner per pixel information, pixel per page information, pages per job information, etc. In one embodiment, processor 21 calculates the probability of job completion and compares such probability calculations to the probability levels received in the job ticket. Thereafter, image forming device 2 outputs the probability information.

At step S18, host device 1 receives the probability information from imaging forming device 2.

At step S20, it is determined whether to use the associated imaging forming device 2 for the particular image job based upon the received probability information. Such usage determination is based upon the comparison of the consumable current amount and the consumable requirement amount associated with the current image job in the described embodiment.

If it is decided to use the associated imaging forming device, the host device 1 instructs the image forming device at step S22 to image the job received in the job ticket.

Alternatively, host device 1 seeks an alternative image forming device at step S24 if there was an unacceptable probability that the current image job would not be imaged. For example, at step S24, the host device can search for another image forming device coupled with a network if so provided. Alternatively, the user is notified of the unacceptable probability and may thereafter rectify the consumable shortage.

Referring to FIG. 6, another exemplary method of providing the imaging of a job is illustrated.

Initially, at step S30, image forming device 2 provides status information to the host. Such status information includes for example consumable status information (current amount information), historical data and resources committed to image jobs already in the queue.

At step S32, host device 1 receives the image device status information.

At step S34, a request is received to image a job.

At step S36, processor 4 estimates a requirement amount corresponding to the received job including an analysis of image job complexity such as the toner/ink required, pages required and/or memory resources required.

At step S38, processor 4 calculates the probability of job completion in comparison to confidence values set by a user.

At step S40, host device 1 displays the probability information for review by a user.

At step S42, the user decides whether to use the associated image forming device. In an alternative arrangement, host device 1 automatically decides whether to use associated image forming device 2 responsive to the probability information.

Image forming device 2 images the job at step S44 if selected by host device 1.

Alternatively, processor 4 proceeds to step S46 to seek an alternative image forming device responsive to the probability information not being acceptable.

Referring to FIG. 7, another method is depicted for imaging a job.

Initially, processor 4 of host device 1 receives a request to image a job at step S50.

At step S52, processor 4 operates to send the job to associated image forming device 2.

At step S54, image forming device 2 estimates the job requirements (consumable requirement amount) for the associated received job. Image forming device 2 also determines consumable current amounts.

Processor 21 proceeds to step S56 to calculate the probability of job completion. Image forming device 2 subsequently operates to output such probability information.

At step S58, host device 1 receives the probability information.

At step S60, it is decided whether to use the associated image forming device based upon the probability information.

If so, host device 1 instructs image forming device 2 to image the job previously received at step S62.

Alternatively, host device 1 seeks an alternative image forming device step S64.

Referring to FIG. 8, one method of calculating probability information in accordance with aspects of the present invention is described in detail. The depicted method is typically executed numerous times during imaging operations. Information regarding previous imaging jobs is utilized to analyze subsequent imaging jobs to provide imaging with increased confidence.

Operation of the depicted method is described with reference to imaging of a plurality of image jobs utilizing historical information obtained from previous image jobs. For example, the depicted method is described initially with reference to the imaging of a first job followed by a description of operations with respect to subsequent jobs.

The depicted method may be executed by processor 4 of host device 1 and/or processor 21 of image forming device 2 or another appropriate facility in the described embodiment. Alternatively, processor 4 and processor 21 are configured to execute dedicated steps of the indicated method.

Initially, at step S100, the appropriate processor estimates consumable requirement amounts for a job to be imaged. During a first image job, the processor uses default usage data (e.g., toner grams per pixel) to determine the requirement amount of a consumable to image the job. In one configuration, a number of pixels is estimated to complete the job to be imaged.

At step S102, the appropriate processor estimates the current amount of a consumable. For the initial image job, a current amount of the consumable corresponds to an initial amount. Thereafter, the amount of consumable utilized to image jobs is subtracted from the initial amount to provide the consumable current amount.

At step S106, the appropriate processor subtracts the consumable requirement amount for the respective image job from the consumable current amount.

At step S108, the processor calculates a probability of completing an entire current image job. Details of an exemplary calculation are described below.

At step S110, the processor determines whether the probability is greater than a confidence value such as a preset limit as set by a user.

The processor proceeds to step S112 if the condition of step S110 is negative. The processor warns the user at step S112 of the probability determination. For example, processor 21 communicates the warning to host device 1 using interface 11 and/or to a local display (not shown). Thereafter, the processor returns to step S100.

If the condition of step S110 is in the affirmative, the processor proceeds to step S114 to image the appropriate job.

Thereafter, the processor proceeds to step S116 to determine image job data. For example, the processor stores actual data corresponding to the actual grams per pixel used and a new amount of consumable within the supply, such as the toner supply 29 in an exemplary embodiment.

At step S118, the processor stores the determined image job data with an appropriate storage device, such as storage device 13, for subsequent use. Thereafter, the processor returns to step S100.

During subsequent executions of the method of FIG. 8, the processor utilizes previous information regarding imaging events. For example, the processor executes the method as described above except at step S116, the processor utilizes historical information to determine image job data including the average use value of the consumable corresponding to an average grams per pixel amount in the described embodiment. Thereafter, the average use value of the consumable is stored as image job data at step S118.

During a third execution of the depicted method, the average use data of the consumable is utilized at step S100 for determining the consumable requirement amount for the respective image job. In addition, at step 116, the processor calculates and stores a new average use value, a standard deviation of the use value and a new amount of toner data. Such information is utilized for subsequent imaging jobs.

For a fourth and later image jobs, the processor utilizes the average use data and the standard deviation of the average use data to estimate an amount of consumable required to image the job within a specified confidence level. At step S116, the processor calculates and stores a new average use value, a new standard deviation of the use value and a new amount of toner data.

As the number of jobs increases, a weighted average may be utilized to replace previously unweighted average for historical information. According to certain aspects of the invention, the following exemplary formula is utilized to determine a weighted average:

Weighted Average=((Sum of all(observations×weighting factor))/ (Sum of all weighting factors))

In such an example of calculating a weighted average, a lower weight (e.g., 1) is assigned to oldest values (e.g., obtained values 1 through 4 with respect to time) while a higher weight (e.g., 3) is assigned to recent values (e.g., obtained values 5 through 8 with respect to time). Other methods of calculating weighted values are utilized in other embodiments.

Statistics are utilized in aspects of the present invention to determine the probability that a given job will be imaged. In the described embodiment, an amount of a consumable remaining and an amount of the consumable necessary to complete a given job are analyzed to determine the probability that a given job will be successfully imaged.

Historical information regarding previous imaging jobs using image forming device 2 is utilized according to certain aspects of the invention to predict the amount of the consumable remaining (current amount) and how much of the consumable will be utilized for the present image job (requirement amount).

More specifically, the consumable requirement amount necessary to complete the image job determination utilizes estimation information for the number of pixels within the image job itself. Thereafter, the estimated number of pixels, a ratio of previously estimated numbers of pixels within previous jobs versus the actual number of pixels imaged for such jobs, and a ratio of consumable grams per pixel are utilized to statistically estimate the consumable current amount and the consumable requirement amount necessary to image the job.

According to other aspects, the processor is configured to determine the consumable amounts using a ratio of an amount of the consumable to a single pixel and to statistically modify the ratio. The processor also statistically modifies the ratio of historical information pertaining to previously estimated amounts of a consumable utilized to image jobs versus the actual amount of consumable in fact used to image the jobs described above.

An exemplary formula is provided below for determining the probability of the completion of an image job as set forth above with respect to step S108 and step S110 according to one possible implementation of the invention.

$$\left((\overline{T}_0 - kS_{T_0}) - \sum_{i=1}^{n} T_{P_i}\right) - \left((P_{S_i}(\overline{R}_{P/S} + tS_{R_{P/S}}/\sqrt{n}))/(T_{PPG} + tS_{T_{PPG}}/\sqrt{n})\right) \geq 0$$

In the above probability equation, variable k is a probability factor determined from probability gamma and confidence level or value alpha. A user inputs such gamma and alpha values using host device 1 or image forming device 2 in the described embodiment. In the described configuration, such probability factor k is determined from a look-up table as set forth in Bowker, Albert, Lieberman, Gerald; *Engineering Statistics* (Prentice-Hall 1972) Table 8.4, pp. 309–316, incorporated by reference herein. For example, for a given probability factor gamma of 0.95 and a confidence level alpha of 95%, a k value of 2.329 is determined.

The user sets the confidence level alpha based upon the likelihood the complete image job will be printed. A relatively low confidence level provides an increased probability that an imaging job will be imaged but not completely imaged due to lack of a consumable. A relatively high confidence level provides an increased probability that an imaging job will be completely imaged but a large number of imaging jobs will be rejected due to a believed lack of a consumable (i.e., a 5% confidence level provides at least partial imaging of most jobs and a 95% confidence level provides complete imaging of only some submitted jobs). Gamma is the probability that a specified portion of the population, 1-α, is included in the population described by $\overline{T}_0 - kS_{T_0}$.

Variable t is a probability factor for a Student's T distribution given a variable n for a number of jobs and the confidence level alpha (e.g., t is 2.074 for a 95% confidence level using the method set forth above with respect to the *Engineering Statistics* text).

Variable $T_0$ is the consumable amount initial average within image forming device 2. Such may be obtained from a consumable manufacturer and corresponds to the average amount of a consumable at the beginning of imaging operations (e.g., average amount of toner within a new toner cartridge). Variable $S_{T0}$ is the standard deviation of the toner amount and may be again supplied from the consumable manufacturer.

A variable $P_{Pi}$ is the number of pixels with previous jobs actually already imaged as determined by imaging forming device 2. Variable $T_{Pi}$ is the toner utilized for previously imaged $i^{th}$ jobs as determined from the number of pixels imaged in such jobs (i.e., the value for $P_{Pi}$ converted using a toner per pixel conversion variable $T_{PPG}$ described below).

Variable $P_{Si}$ is the number of pixels required for the already imaged jobs as estimated by host device 1 or image forming device 2, for example. Variable $R_{P/S}$ is the average ratio of $P_{Si}$ divided by $P_{Pi}$. Variable $S_{RP/S}$ is the pixel ratio standard deviation delta corresponding to the variable $R_{P/S}$.

Variable $T_{PPG}$ is the average number of pixels per gram toner usage estimate. Such is determined utilizing default values and thereafter updating such variable with hard consumable level indications from the consumable monitoring device and the $P_{Pi}$ variable. Variable $S_{TPPG}$ is the standard deviation of the variable $T_{PPG}$ corresponding to pixels per gram toner usage.

In the described exemplary formula, the $((\overline{T}_0 - kS_{T_0}) - \Sigma T_{P_l})$ term defines an exemplary consumable current amount and the $((P_{S_l}(R_{P/S} + tS_{R_{P/S}}/\sqrt{n}))/(T_{PPG} + tS_{T_{PPG}}/\sqrt{n}))$ term defines an exemplary consumable requirement amount corresponding to a new image job.

The following example illustrates aspects of the probability determination using the above formula and a plurality of example values below.

| Expression | Example Values |
|---|---|
| n | 23 |
| k | 2.35 |
|  | for $\alpha = .95$ & |
|  | $\gamma = 95\%$ |
| t | 2.074 |
|  | for $\alpha = 95\%$ |
|  | CL |
| $T_{P_l}$ |  |
| $\overline{T}_O$ | 251 grams |
| $S_{T_O}$ | 25.1 grams |
| $P_{P_l}$ | 1.51 E7 Pixels |
| $P_{S_l}$ | 1.64 E7 Pixels |
| $\overline{R}_{P/S}$ | 0.921 |
| $S_{R_{P/S}}$ | .0102 |
| $T_{PPG}$ | 2.001 E6 |
| $S_{T_{PPG}}$ | 1.752 E5 |

So assuming:

$$\sum_{l=1}^{n} T_{P_l} = 58.73 \text{ grams}$$

$$((\overline{251 \text{ gms}} - 2.35 * 25.1 \text{ gms}) - 58.73 \text{ gms}) -$$
$$((1.64 E7 \text{ pix} * (.921 + 2.074 * .0102/\sqrt{23}))/$$
$$(2.001 E6 \text{ pix/gm} + 2.074 * 1.752 E5 \text{ pix}/\sqrt{23})) \geq 0$$

In the described example, 184.71 gms>0 and accordingly the image job will be imaged.

The protection sought is not to be limited to the disclosed embodiments, which are given by way of example only, but instead is to be limited only by the scope of the appended claims.

What is claimed is:

1. An image forming system comprising:
   an image engine configured to use a consumable to produce an image;
   a consumable monitoring device configured to provide a current amount of the consumable;
   a memory device configured to store historical information regarding the consumable; and
   a processor configured to provide a requirement amount of the consumable for an image job to be imaged, to statistically modify at least one of the requirement amount and the current amount using the historical information, and to analyze the requirement amount with respect to the current amount after the modification to determine the probability that the image job will be successfully imaged.

2. The system according to claim 1 wherein the processor is configured to statistically modify responsive to a confidence value.

3. The system according to claim 1 wherein the processor is configured to weight at least some of the historical information.

4. The system according to claim 1 wherein the processor is configured to statistically modify the requirement amount and the current amount.

5. The system according to claim 1 wherein the image engine is configured to use the consumable comprising toner to produce the image.

6. The system according to claim 1 wherein the processor is configured to statistically modify the requirement amount using historical information comprising a ratio of an estimation of the number of pixels within previous image jobs and the actual number of pixels within the previous image jobs.

7. The system according to claim 1 wherein the processor is configured to provide the requirement amount using a ratio of an amount of the consumable to a pixel and to statistically modify the ratio.

8. The system according to claim 1 wherein the image engine comprises a print engine configured to use the consumable comprising toner to print the image.

9. The system according to claim 1 further comprising an interface configured to communicate information regarding the analysis.

10. A method of forming an image comprising:
    providing a current amount of a consumable;
    storing historical information regarding the consumable;
    providing a requirement amount of the consumable to produce an image job to be imaged;
    modifying at least one of the current amount and the requirement amount using the historical information;
    analyzing the requirement amount of the consumable with respect to the current amount of the consumable after the modifying; and
    forming the image corresponding to the image job using the consumable after the analyzing.

11. The method according to claim 10 wherein the analyzing comprises subtracting the requirement amount from the current amount.

12. The method according to claim 10 further comprising providing a confidence value, and the analyzing comprises analyzing using the confidence value.

13. The method according to claim 10 further comprising weighing at least some of the historical information before the modifying.

14. The method according to claim 10 wherein the modifying comprises statistically modifying using the historical information.

15. The method according to claim 10 further comprising communicating information regarding the analyzing.

16. The method according to claim 10 wherein the forming comprises forming using the consumable comprising toner.

17. The method according to claim 10 wherein the modifying comprises modifying the requirement amount using historical information comprising a ratio of estimations of the number of pixels within previous image jobs and the actual number of pixels within the previous image jobs.

18. The method according to claim 10 wherein the modifying comprises modifying the requirement amount using a ratio of an amount of the consumable to a pixel.

19. The method according to claim 10 wherein the forming comprises printing.

20. An image forming system comprising:
    a print engine configured to print images using toner;
    a consumable monitoring device configured to provide a current amount of the toner;

a memory device configured to store historical information regarding usage of the consumable to print previous print jobs; and a processor configured to provide a requirement amount of the toner for a print job to be printed, to statistically modify the requirement amount of the toner and the current amount of the toner using the historical information, and to analyze the requirement amount with respect to the current amount after the modification to determine the probability that the print job to be printed will be successfully printed, wherein the processor is configured to statistically modify the requirement amount of the toner using historical information comprising a ratio of estimations of the number of pixels within previous print jobs and the actual number of pixels within the previous print jobs.

* * * * *